United States Patent [19]

Baker, III et al.

[11] 4,216,658
[45] Aug. 12, 1980

[54] REFRIGERATION MEANS AND METHODS

[76] Inventors: Ralph N. Baker, III, 18 Callecita, South Laguna, Calif. 92675; James D. Bond, 1724 Port Sheffield, Newport Beach, Calif. 92660; Byron W. Olson, 435 Via Lido Soud, Newport Beach, Calif. 92663

[21] Appl. No.: 904,937

[22] Filed: May 11, 1978

[51] Int. Cl.³ .......................................... F25D 17/02
[52] U.S. Cl. ...................................................... 62/99
[58] Field of Search ................. 62/98, 99, 430, 434, 62/438, 439, 185, 201, DIG. 7

[56] References Cited

U.S. PATENT DOCUMENTS

| | | |
|---|---|---|
| 237,312 | 2/1881 | Noyes . |
| 1,657,447 | 1/1928 | Lindseth . |
| 1,951,496 | 3/1934 | Stevens . |
| 1,963,698 | 6/1934 | Garre, Jr. . |
| 1,998,698 | 4/1935 | Bach . |
| 2,013,848 | 9/1935 | Heideman . |
| 2,044,482 | 6/1936 | Muffly . |
| 2,063,646 | 12/1936 | Whitesel .................. 62/406 |
| 2,128,021 | 8/1938 | Smith . |
| 2,137,541 | 11/1938 | Muffly . |
| 2,137,555 | 11/1938 | Young . |
| 2,153,696 | 4/1939 | Philipp . |
| 2,160,389 | 5/1939 | Palmer ..................... 62/185 X |
| 2,323,354 | 7/1943 | Rees ........................ 62/438 X |
| 2,428,311 | 9/1947 | Hepbener . |
| 2,430,329 | 11/1947 | Davis ........................ 62/155 |
| 2,515,825 | 7/1950 | Grant . |
| 2,677,243 | 5/1954 | Telkes ...................... 62/430 X |
| 2,737,027 | 3/1956 | Kleist ....................... 62/DIG. 7 |
| 2,791,102 | 5/1957 | Kleist ....................... 62/439 X |
| 2,795,114 | 6/1957 | Kleist ....................... 62/DIG. 7 |
| 2,875,595 | 3/1959 | Kleist ....................... 62/DIG. 7 |
| 2,899,694 | 8/1959 | Horowitz ........................ 5/90 |
| 3,156,101 | 11/1964 | McGuffey ............... 62/430 X |
| 3,228,205 | 1/1966 | Franklin .................. 62/430 X |
| 3,670,522 | 6/1972 | Bresin ........................ 62/99 X |
| 3,744,272 | 7/1923 | Oldberg ....................... 62/439 |
| 3,845,638 | 11/1974 | Apple, Jr. et al. ............ 62/426 |
| 3,848,429 | 11/1974 | Franklin, Jr. ............... 62/439 |

Primary Examiner—Lloyd L. King
Attorney, Agent, or Firm—Grover A. Frater

[57] ABSTRACT

An energy-saving refrigeration system capable of reducing the quantity of energy and the cost required to operate refrigerators while contributing to greater efficiency in the operation of the utility facility that supplies the energy is provided by treating separately the functions of producing cold and using that cold to accomplish refrigeration. Cold is produced in a compressor, condenser evaporator combination, and is stored in a cold storage unit from which it is removed, by heat input, at selected times. The times of cold production and of cold utilization are selected so that they accomplish a continued and adequate refrigeration function while transferring most energy usage from the highest cost peak load period of the energy source to another time. Certain features, including a cold storage unit and shroud, enhance efficiency. The method of defrost and case condensation control additionally reduces energy required for evaporator frost and case moisture removal.

12 Claims, 9 Drawing Figures

REFRIGERATION MEANS AND METHODS

BACKGROUND OF THE INVENTION

Food storage refrigerators of conventional design present two major problems. The first arises because home refrigerators use energy at the times when the utility company that supplies that energy experiences its peak load. Most, if not all, utility power companies are called upon to supply energy at a much higher rate during some periods of the day than at other periods. Thus, for example, the mid-afternoon demand on a weekday may be several times the demand at night and on weekends. Suppliers of energy must provide facilities at major capital cost which are capable of meeting the peak demands for energy. The result is that costly energy conversion and distribution facilities operate at far below capacity much of the time. The cost of energy at the point of use is necessarily much greater than it could be if those facilities were used more efficiently. Further, under present and proposed time-of-day rates for electrical energy, the cost to the refrigerator owner of energy used during peak periods is several times greater than at other times.

For many energy suppliers, the energy used in home refrigerators represents a very significant part of the total load. Very substantial and important savings could be realized if the load represented by home refrigerators were to be shifted to periods of low demand. That can be, and has been, done by powering refrigerators from circuits that are simply de-energized during the supplying utilities' peak demand periods. However, that solution can result in spoiling of food and a health hazard with present refrigerator designs.

Inefficiency per se is the second of the two major problems presented by conventional refrigerator designs. In the conventional system, the entire refrigeration system, both refrigerant circuit and air flow circuit, is governed by sensing ambient air temperature within the refrigerator box. Each time the door is opened, the ambient temperature increases. Unless the period of door opening is very short, the temperature sensor will demand cooling, the compressor motor, which accounts for over 80% of the electrical energy required for refrigerators, will be turned on, and the in-rush current to the motor will be high. In that cycle, which may be repeated many times, there is energy waste in frequent start-up followed by a short interval running time. The result for the refrigerator owner is excessive use of energy resulting in higher cost. The national result is waste of a limited resource. Moisture control of condensation on the exterior of the refrigerator enclosure and of frost on the surface of the evaporator usually accounts for over ten percent of the electrical energy used in refrigerators. The conventional defrost control consists of a timer which, on a set time cycle, energizes an electric heater which removes frost by convective and radiant heating of the entire evaporator body to a temperature sufficient to melt the frost. Timing intervals and on periods of these systems are pre-set and must be based on defrosting under worst case conditions without regard to the actual presence or absence of frost, wasting energy. Similarly, heaters used to eliminate the moisture of condensation on the exterior of the enclosure operate on a set basis without regard for actual conditions, wasting energy. Past efforts to solve the efficiency problem in refrigerators have been directed primarily to providing better insulation, and to providing more efficient compressors and evaporators.

This invention reduces the total energy required for residential refrigeration and shifts the demand for the energy occurring during high-cost peak periods to other times of lesser demand and cost, and it provides that contribution in new dimensions.

The residential refrigerator requires sixteen percent of all of the oil imported into the United States from the Middle East. Test results demonstrate that this invention provides the potential to remove as much as twenty-five percent of that requirement.

SUMMARY OF THE INVENTION

The object of the invention is to increase the efficiency of refrigerator operation and to require the majority of energy used for refrigeration to be used at other than high-cost peak load periods. It is an object to provide significant increased efficiency both for the supplier of refrigeration energy and for the user of that energy. A related object is to provide a refrigeration system and a refrigeration method in which users, refrigerator manufacturers, utility companies and governmental agencies will all obtain clear advantages, and which all will be motivated to support and to adopt.

These objects and advantages, and others which will become apparent in what follows, are realized, in part, by the combination of the steps of producing and storing cold during the energy suppliers' non-peak load times with the step of releasing of that cold to accomplish refrigeration as required, but without use of the compressor during peak load high energy cost periods. To enable the practicing of that method, the conventional evaporator is replaced with an evaporator which provides for storage of cold and the conventional control method is replaced with a control system which manages separately the refrigerant circuit from the air flow circuit.

The air flow circuit in one preferred form includes a fan and ducting for causing air flow over the cold storage unit at selected times. The invention permits the employment of a conventional refrigerant circuit including a compressor, condenser and evaporator in a closed circuit in which the refrigerant circulates. To utilize that conventional circuit is one of the objects and advantages of the invention.

One of the major advantages, and one of the major objectives, of the invention is to recognize and accommodate the difference in the highly efficient, rapidly accomplished refrigerant circuit heat transfer, on one hand, and the much less efficient and more slowly accomplished airflow circuit heat transfer.

The method of the invention presents opportunity for a number of variations that contribute to optimization of energy saving. Thus, in a preferred form of the invention, cold is stored in a unit that is not a "good" thermal energy transfer unit until cold is required. Cold is extracted from cold storage by a positive action even during peak periods when compressor operation is not permitted. A new heat exchanger design in the preferred embodiment assures a high rate of heat transfer from the air to the evaporator contributing to the efficiency of the air flow circuit heat transfer portion of the system.

It is a feature of the invention to provide a means for anticipating the high energy cost peak load periods and to operate the compressor during the preceding low energy cost periods to assure adequate cold storage just prior to a high cost period.

In another refinement, a means is provided for preventing the simultaneous, or near simultaneous, turn on of many refrigerators at the end of the high cost peak load period of the energy supplier.

The invention further embodies a highly efficient method of defrosting the evaporator in which the energy required for the defrost function is a fraction of that required in conventional systems.

It is a feature of the design of the invention that the improved system may be installed in refrigerator enclosures now in production without major modification, assuring adoption and contribution of the system to the national energy conservation goal within a short time period at minimal cost.

Up to this point, only the compressed refrigerant type of refrigeration system has been mentioned. That type is almost always powered by electricity and, to the extent that the purpose of the invention is to satisfy the need for peak load relief, the invention is directed to that kind of refrigerator. However, there is another kind of refrigeration cycle in which input power is supplied as heat which causes a liquid to vaporize. In both kinds of refrigeration, refrigeration derives from the fact that evaporating liquids absorb heat and condensing gasses absorb cold. In the compression system, gasses are forcibly compressed, and in the heat input system, liquid is forcibly turned to gas. To the extent that the invention relates to increasing the efficiency of the refrigeration unit per se it is applicable to both kinds of refrigeration and local usage notwithstanding, "refrigerant" means the material that flows through either system and alternates between gaseous and liquid state.

While heat input refrigerators are much less popular for home refrigeration, they are widely used in recreational vehicles and boats. It is usually not preferred to operate a gas powered refrigerator while in motion, so a system is needed which can store cold and which can control cold production and cold untilization separately.

These and other advantages and summaries of the invention will become apparent in the specification which follows and from an examination of the drawings.

DRAWINGS

DESCRIPTION OF PREFERRED EMBODIMENTS

Figure 1:
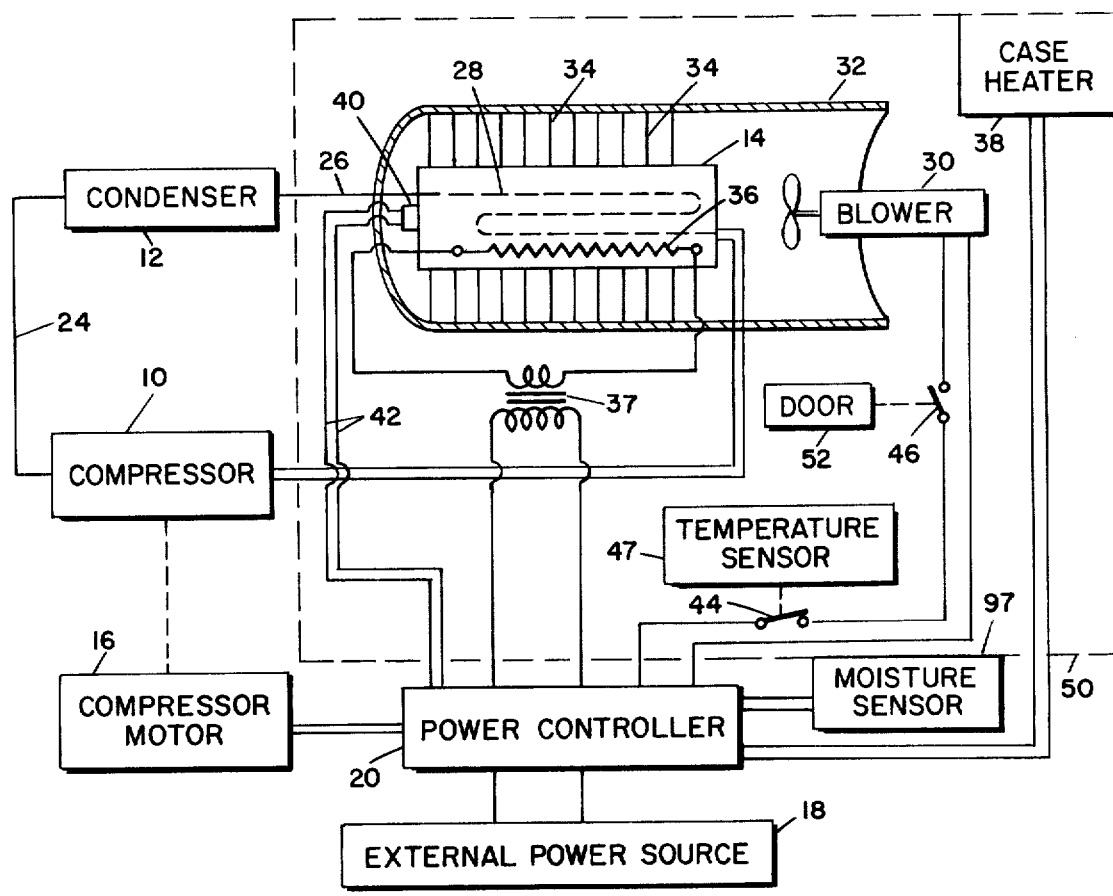
FIG. 1 is a partly schematic, partly diagrammatic representation showing a preferred embodiment of the invention.

The system arrangement of one preferred form of the invention is depicted in FIG. 1. That system includes a compressor 10, a condenser 12, and a combined evaporator and cold storage unit 14. The compressor is driven by a compressor motor 16 the power for which is supplied from an external power source represented by the block 18 through a power controller 20. The compressor 10, condenser 12, and the evaporator portion of the unit 14 are connected in series in a fluid circuit. The compressor delivers high-pressure gas refrigerant to the condenser 12 through a line 24. The function of the condenser is to dissipate the heat in the compressed gas refrigerant and to deliver cool liquid refrigerant by capillary line 26 to the evaporator conduit 28. The liquid is permitted to escape through an orifice or a metering valve. It expands and becomes a gas in the flow conduits 28 within the unit 14. Those conduits are represented by dashed lines. As the liquid expands to a gas in the evaporator conduits it draws heat from its surroundings, cooling them.

In this invention, the conduit 28 is surrounded by a medium whose particular property is the ability to store cold. That medium may be any one of a number of well known substances and is called the "core" material. One example is salt water; another is ethylene glycol solution. That cold storage medium is housed in an enclosure which, because of its design or its material, transfers heat into the storage medium, i.e. releases cold to the refrigerator space, at a relatively low rate until some special means is provided for increasing the rate of the heat input or cold output. Thus it is that the cold storage portion of unit 14 has a special character and function. On the other hand, the compressor 10, the condenser 12, and the compressor motor 16, and the evaporator element may have conventional design and, in this embodiment, do have conventional design.

A means is employed by which to increase the rate of cold output from the cold storage portion of the unit 14. In this embodiment, that means comprises a fan, or blower, 30 which, when operated, forces air to pass through an encompassing shroud 32. The shroud surrounds the unit 14. The shroud is fitted with a number of internal vanes, two of which have been numbered 34 for identification. Those vanes are a preferred form of a means for causing the motion of air over the unit 14 to be turbulent so that there is a greater degree of contact between that air and the surface of the unit 14. In this case, the vanes 34, or at least most of them, do not actually engage the surface of unit 14. They are not heat conduction fins. They are removed from significant heat conducting contact with unit 14 to avoid formation of ice at the junction between the fins and heat storage unit. The use of heat conduction fins is not foreclosed in the invention, but in this preferred embodiment they are not used.

In this embodiment a resistance wire is applied to the outer surface of the unit 14. It is arranged so that when energized it will melt quickly any frost which is in direct contact with its outer surface. The resistance wire is identified by the numeral 36. The energization path for the heater extends through a transformer 37 to the power controller 20.

A means is provided for measuring the quantity of cold that is stored in the cold storage portion of unit 14. Since the storage material has a fixed volume and mass, the quantity of cold stored within it can be determined simply by measuring its temperature, and that is what is done in this preferred embodiment. The temperature sensor 40 is disposed in temperature sensing relation to the cold storage medium and supplies a signal which is indicative of temperature to the power controller 20 by sensor lines 42.

The fan, or blower, 30 is powered through power controller 20 and supply lines which include, in series, a switch 46 and a switch 44 whose operation is controlled by a temperature sensor 47. That sensor senses the ambient air temperature within the refrigerator of which this system is a part, and it closes switch 44 when the ambient temperature rises above some preset level. The shroud 32, the evaporator and cold storage unit 14, the fan 30, the temperature sensor and a door switch 46 are all enclosed in a cold box or enclosure which is represented in FIG. 1 by the dashed line 50. The enclosure includes a door 52 which affords access to the interior of the enclosure from its exterior. Operation of that door operates the switch 46.

Figure 2:
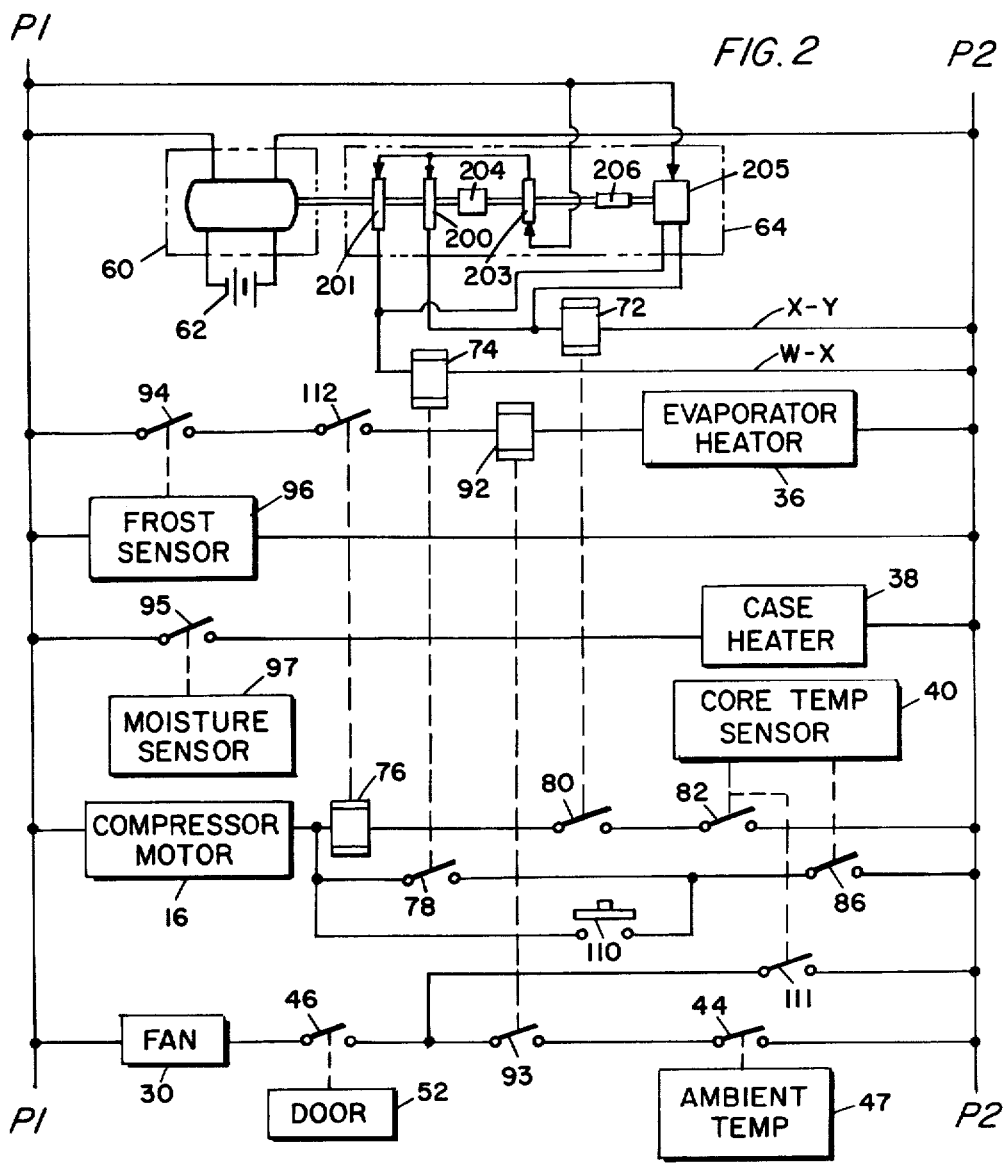
FIG. 2 is a schematic diagram, in expanded form, of the electrical elements of FIG. 1.

The exterior surface of a refrigerator may become sufficiently cold to condense moisture from the air in humid weather. It is common practice to include a heater element in the enclosure whose function is to heat the enclosure walls. Operation of the heater is controlled by a moisture sensor. The unit of FIG. 1 includes such a heater, case heater 38, and a moisture sensor 94. The power controller 20 of FIG. 1 is shown in expanded form in FIG. 2 together with some of the sensors, switches and other elements of FIG. 1. More particularly, the heater 36 and transformer 37 of FIG. 1 is represented by the block labelled "EVAPORATOR HEATER" and numbered 36. Also shown in FIG. 2 are the fan 30, the door 52, the door switch 46, the compressor motor 16, the ambient sensor 47, and its switch 44, the moisture sensor 97, the case heater 38, and the core temperature sensor which has an upper and lower limit. The remainder of the elements in FIG. 2 form the power controller 20. Power is applied to lines P-1 and P-2. That power is employed to operate clock 60. The clock is connected to a source of battery power 62 which supplies power automatically in the event that no power is available at lines P-1 and P-2. That source of battery power is effective to keep the clock running during periods of power outage and when the apparatus is being moved from one place to another or when, for any other reason, power is disconnected from the line. In preferred form, that battery is capable of running the clock for at least two years and has a shelf life approaching the expected useful life of the refrigerator.

The function of the clock is to make power available for operating the compressor, motor, and any other element of the system whose operation is to be prevented at selected times. In the embodiment shown, only the compressor motor must be prevented as a function of time. To perform its function, the clock rotates cams. The cams actuate switches which control application of power to relay coils 72 and 74. The cam set 64 in this embodiment is arranged to apply power to relay coil 72 at all times except during time interval beginning at time X and ending at time Y. Power is applied to relay coil 74 at all times except during inervals beginning at time W and ending at time X.

Figure 3:
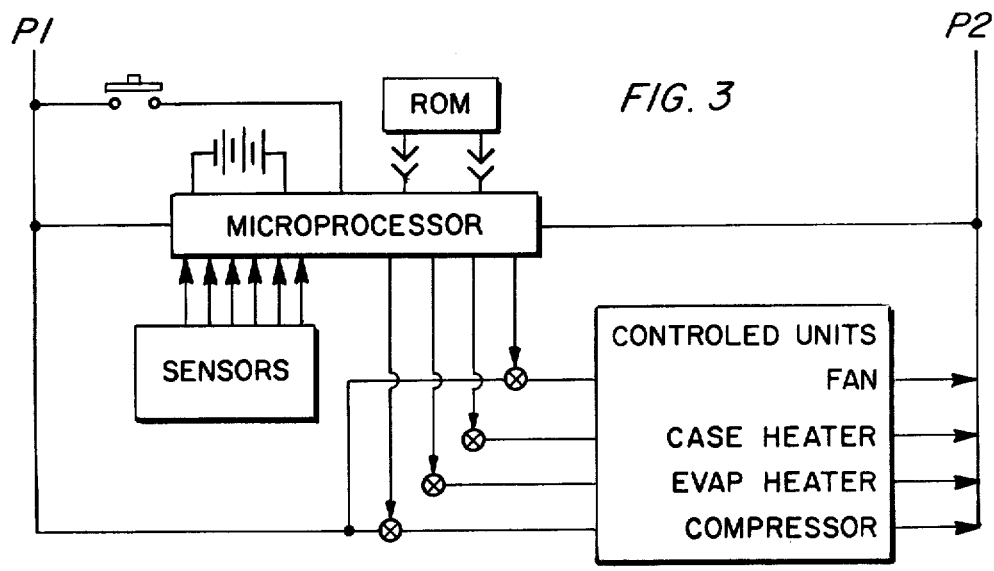
FIG. 3 is a diagram of an alternative form of control unit.

In practice, the power controller might be a microprocessor as illustrated in FIG. 3, but micro-processors do not lend themselves to diagrammatic representation in readily understandable form. For the sake of clarity, and to meet the obligation to describe the best embodiment and form, the functional operation of the microprocessor has been depicted in FIG. 2 using symbols taken from the electro-magnetic controller art. Given the diagram of FIG. 2, it is well within the skill of workers in the computer arts to reproduce the functional equivalent in a micro-processor using the instruction sets published by the manufacturers of the selected micro-processor devices.

In FIG. 2, a relay coil 72 is included in the output line X-Y. The relay coil 74 is included in the output line W-X. Coil 74 operates normally open relay contact 78. Coil 72 operates normally open relay contact 80. Contact 80 is connected in a line that extends from line P-1 to line P-2 and which includes the compressor motor 16, a relay coil 76, and a normally open switch 82 which is operated at high limit temperature by the core temperature sensor 40. Switch 78 is connected in a line that extends between power lines P-1 and P-2 and which includes the compressor motor 16 and a normally closed switch 86 which is operated at the low limit temperature by temperature sensor 40. Finally, the compressor circuit includes a manual over-ride switch 110 which is connected in parallel with the switch 78.

The high limit section of the temperature sensor 40 also operates switch 111 which is connected in a line that extends from power line P-1 to power line P-2 and includes the blower or fan 30 and the door switch 46. The fan or blower 30 and the door switch 46 are also connected in a second line that extends from power line P-1 and P02. That second line includes switch contacts 93 which are controlled by relay coil 92, and it includes the switch 44 which, as previously described, is operated by an ambient temperature sensor 47. A third line extends from power line P-1 to power line P-2 and includes a switch 95 operated by moisture sensor 97 and case (enclosure) heater 38. The relay 92 is in series with a fourth line that extends from power line P-1 to power line P-2. That line includes, in series, a switch 94 which is under the control of a frost sensor 96 and the evaporator heater 36. The frost sensor includes a timer and is powered from lines P-1 and P-2. It closes switch 94 when frost is sensed and keeps it closed for a fixed time.

Summarizing, the contro-ler controls five separate electrical control circuits. One of them includes the compressor motor 16. That motor can be energized through the combination of time control switch 80 and core temperature sensor switch 82 and it can be energized through a time controlled switch 78. A second circuit controls operation of the fan or blower 30. It can be energized through either of two sub-circuits both of which include the make-break door switch 46. One of those circuits includes ambient temperature switch 44 and a switch 90 by which fan operation is coordinated with heater operation. The other energizing circuit includes a switch 111 by which operation of the fan is coordinated with the core temperature sensor 40. The third circuit includes the moisture sensor and case heater. The fourth circuit includes the frost sensor and evaporator heater, and the fifth controls the on time of the evaporator heater.

The moisture sensor continuously senses the presence of moisture so that the case heater is energized only until the moisture is removed and is not energized if moisture is not present. The sensor is set to a predetermined level so that it will not energize the case heater until a certain level of moisture is present. It is desired to operate the evaporator heater only when the frost accumulation exceeds a prescribed amount so that frost sensor 96 is arranged to determine whether that amount of frost exists and to close switch 94 when it does.

The circuit is arranged so that the blower will not operate while the heater is operating, and that is accomplished by an interlock between the two circuits. More specifically, when the heater is energized, the relay coil 92 will be energized, it opens switch 93 so that the ambient temperature switch 44 is ineffective to control fan operation.

Further, the circuit is arranged so that the evaporator heater will not operate when the compressor motor is energized, which is accomplished by an interlock between the two circuits. When the compressor is energized, the relay coil 76 is energized, opening switch 112 so that the frost sensor switch 94 is ineffective to control evaporator heater operation.

The clock and cam set combination make it possible to prevent operation of the compressor motor during periods that represent high energy cost peak load periods of the public utility which supplies energy to the refrigeration system. That is done by using the clock to open switches 78 and 80. The time when the compressor is prevented from operating by the opening of those switches is conveniently identified as the "peak load period," and is the period from X to Y.

It is a feature of this embodiment to provide assurance that the cold stored in the evaporator will be at its maximum immediately preceding a high cost peak load period when the compressor will normally be restricted from use. The relay 74 is arranged so that within the time period shown as W-X in FIG. 2 (typically one-half hour) immediately prior to the beginning of a peak load period it will close switch 78 and permit energization of the compressor motor through switch 86. The core temperature sensor 40 is arranged so that it will close switch 86 if the core temperature is higher (warmer) than minus 15 degrees.

It is a further feature of this embodiment that the cold storage level of the evaporator be maintained separately from the requirement for cooling the air within the refrigerator compartment and that the storage level be maintained at a temperature range consistent with the most efficient operation intervals of the compressor and within prescribed limits during hours other than the peak load period. The core temperature sensor 40 is arranged so that at the high limit (warmer) core temperatures above zero degrees Fahrenheit it will close switch 82 and open when the core temperature reaches the lower (colder) limit of minus 15 degrees.

It is a further feature that the structural material of the evaporator provide for efficient low cost manufacture while at the same time providing for maximum retention of cold stored in the evaporator core material. In a preferred embodiment the structural evaporator material is plastic of a sanitary formulation readily formed by continuous extrusion, assuring manufacture at low cost. The plastic formulation selected has the further characteristic of high thermal conductivity at low temperatures. The family of polystyrenes are among the preferred formulations.

In its arrangement of the evaporator in relation to its shroud and the internal vanes of the shroud, as shown in FIG. 1, the preferred embodiment provides for restriction of air flow when the fan is off. This arrangement also restricts convection and assures the retention of cold through capturing and minimizing air flow when the door to the refrigerator compartment is opened.

The greater heat transfer efficiency of the refrigerant circuit (compressor to condenser to evaporator) is captured and stored, thereby enabling the compressor to be restricted from operation during high energy cost periods, resulting in reduced cost of operation for refrigeration. A further advantage of the storage feature is that the compressor runs for a longer time per start, resulting in a total reduction in energy required for refrigeration due to the initial high energy use required to start electric motors.

The less efficient heat transfer from the evaporator to the load through use of the air circuit is the subject of separate control. Air, having low conductivity and poor thermal transfer, requires that its efficient use in refrigeration provide for the greatest cold saturation of the air as possible. Cold saturation of the air medium through the turbulation of the air is achieved by means of vanes provided in the shroud and by an extended path of exposure provided by the maze created by the juxtapositioning of the vanes in the shroud.

Figure 4:
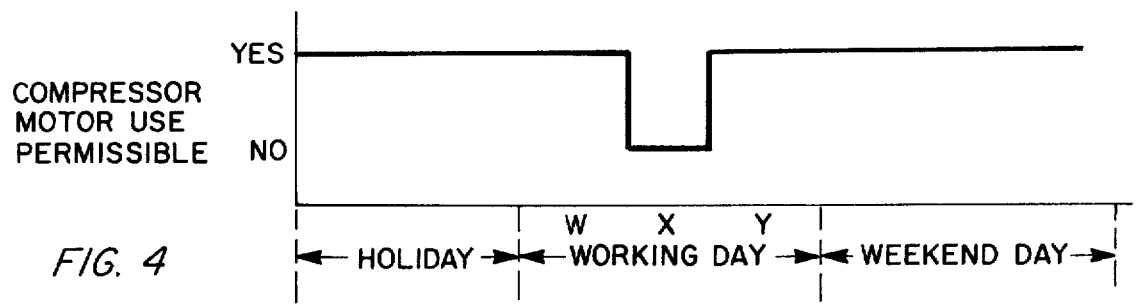
FIGS. 4, 5, 6 and 7 are graphs illustrating some of the possible modes of operation of the embodiment of FIG. 1.
Figure 6:
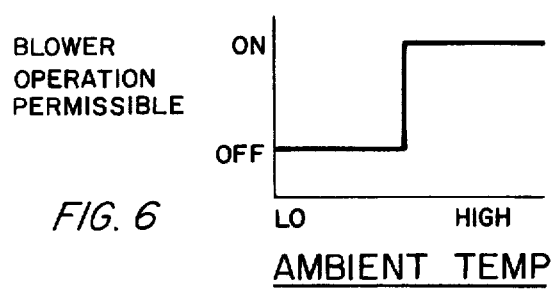
Figure 7:
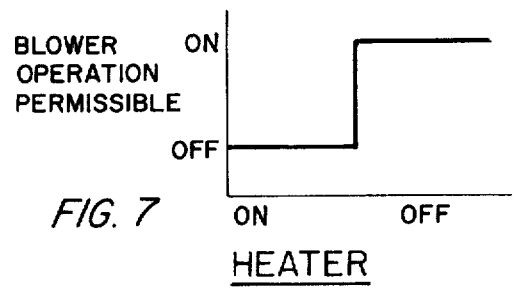
Figure 5:
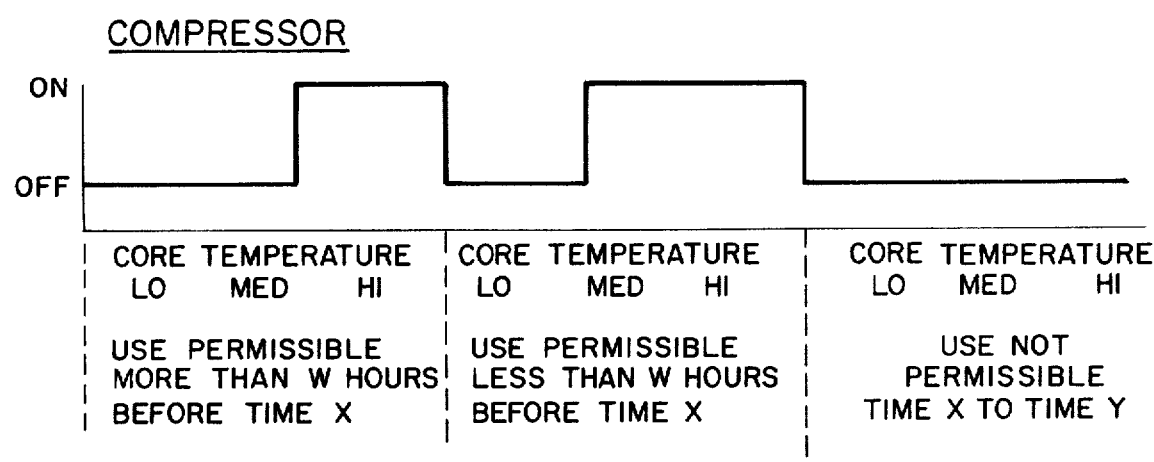

To maintain an efficient operation, frost must be removed from the cold storage unit. To perform that task efficiently requires the input of heat, and that is done by installing a full contact electric heater on the several working surfaces of the cold storage unit. The heater is arranged to melt frost rapidly while introducing a minimum amount of heat into the ambient air and the cold storage unit. This is accomplished with a limited use of energy as the frost accumulates directly on the heater surface, permitting direct melting through contact application of heat. A preferred method is to sense the presence of frost and turn the heater on only in those periods when the frost exceeds some predetermined amount and for a limited time for each on period. Ordinarily, it is preferred that the heat exchange between the air and the cold storage unit be suspended at times when the heater is on. The logic scheme depicted in FIG. 2 prevents the fan from operating when the heater is energized. To aid the understanding of the timing of the several events that make up system operation, reference is made to FIGS. 4, 5, and 6. FIG. 4 is a graph showing the time when it is permissible to use energy to operate the compressor motor in a representative situation. The graph assumes that the public utility which supplies energy for the refrigerator experiences its peak load in the period between time X and time Y, and that occurs on regular working days but does not occur on holidays or weekends. Accordingly, a combination of the clock 60 and programming element 64 is arranged so that it is possible to energize the compressor motor at any time on a holiday, at any time except during the high energy cost period during a working day, and at any time during a weekend day. FIG. 5 assumes the use of a core temperature sensor with a high and low limit so that it is possible to measure a high core temperature, such, for example, as zero degrees; and a low temperature, such, for example, as minus 15 degrees. It also assumes that the timer is capable of energizing line W-X in the period from time W to time X. FIG. 5 shows that the compressor can be turned on in the time preceding time W when the core temperature is high. In the anticipatory interval, which is defined as the time between time W and time X, the compressor motor is energized if the core temperature is above the lower limit. Finally, no use of the compressor motor is permissible in the interval from time X to time Y. FIG. 6 shows that fan operation is permissible if the ambient temperature is high. FIG. 7 shows that the fan may be operated only when the heater is off.

Figure 9:
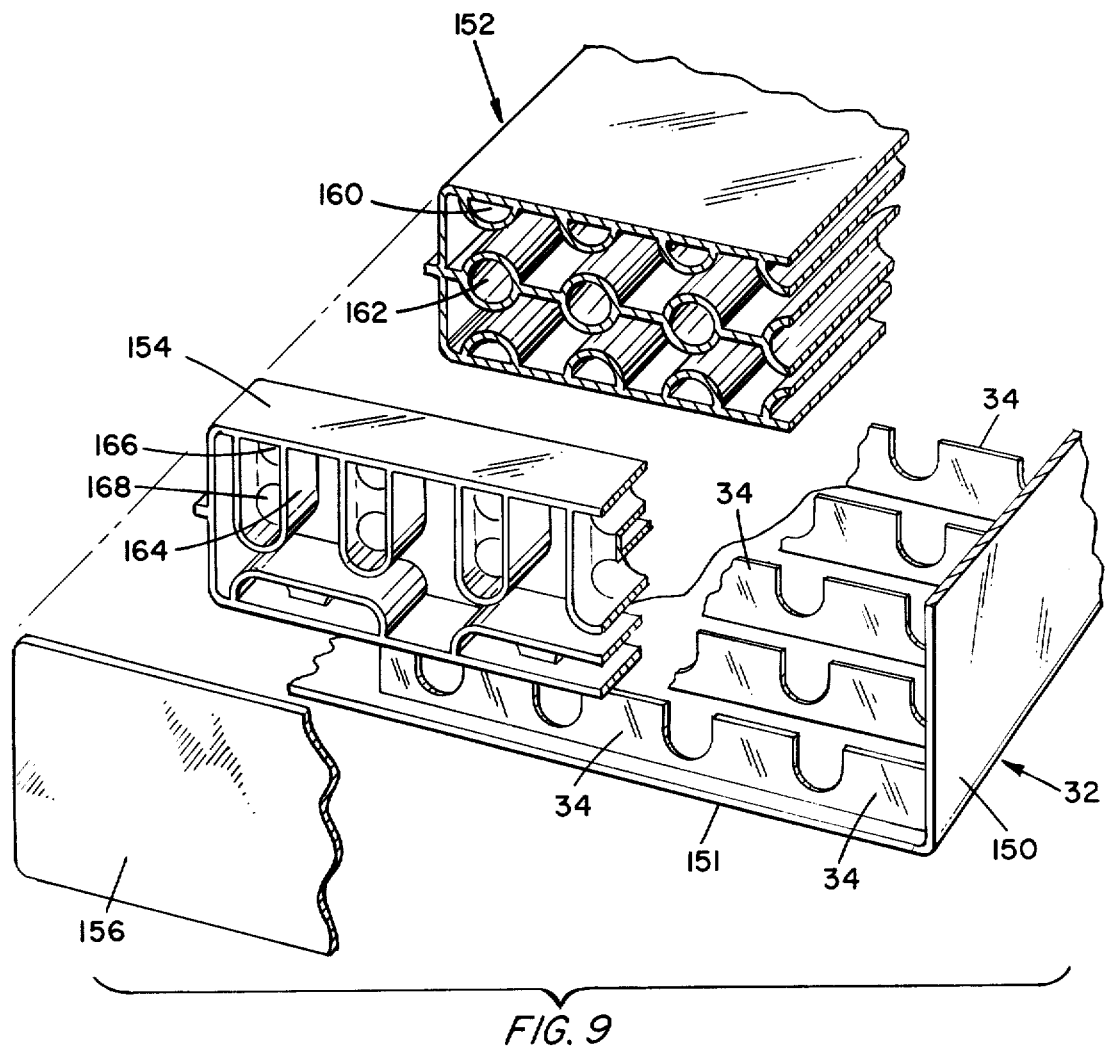
FIG. 9 is an exploded view, partly in section, of fragments of the elements shown in FIG. 6.
Figure 8:
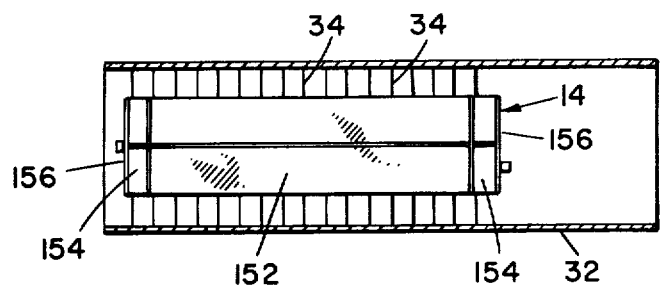
FIG. 8 is an enlarged view, partly in cross-section, of elements of FIG. 1.

A wide variety of mechanical arrangements for the evaporator and the cold storage unit is possible. Nonetheless, there are some preferred forms, and the best form thus far devised is depicted in FIGS. 8 and 9. FIG.

8 is an enlarged cross-sectional view of the shroud structure 32 and the combined evaporator and cold storage unit 14 that is depicted in FIG. 1. In a representative home refrigerator installation the shroud might measure 12 inches wide, four inches high and about 28 inches long. The shroud comprises an elongated tube, rectangular in cross-section and formed of metal or plastic. The upper and lower surfaces of the tube are fitted with a series of vanes that extend from the interior wall inwardly toward the unit 14. They are placed only in that portion of the length of the rectangular tube over which the unit 14 extends. Again, several of them have been marked with reference numeral 34 for identification. A fragment of that shroud is shown in FIG. 9. It comprises a side wall 150 and a lower wall 151. The vanes 34 are arranged in rows that extend transversely across the width of the shroud. The vanes in this embodiment are formed by cutting away portions of a series of barrier walls each of which extends continuously across the shroud. Openings in the barriers are spaced apart a distance of approximately equal to their width. Alternate rows along the length of the shroud are arranged so that their openings are disposed at a position opposite the closed area of the vanes in the row ahead and the row behind. The effect is to create a longer path for air flow through the shroud and to render air flow very turbulent whereby the degree in which that air makes contact with the surface of the cold storage unit 14 is increased. As a consequence, the absorption of heat from the air to storage unit is accomplished more efficiently. In the absence of air being forced through the shroud, very little movement of air occurs within the shroud, and heat transfer is minimized and retained cold storage maximized. The unit 14 comprises a central elongated section 152, an end connector section 154 at each end, and a covering plate 156 at each end. The central section is arranged as best depicted in FIG. 9. This unit is formed of plastic or metal, and it is arranged so that a number of through passages for the flow of refrigerant is formed. The space around those passages is filled with a cold storage medium. That space and the cold storage medium are called the "core." The material of the medium has been omitted from the drawing for the sake of clarity. The end members 154 are attached to the respectively associated ends of the member 152, and they serve to complete a connection from one channel to another so that all of the channels of the member 152 are connected in the series. Thus, for example, the passageways 160 and 162 of member 152 are interconnected when the member 154 of FIG. 9 is placed into engagement with end of member 152. The connection from conduit 160 to conduit 162 is completed in element 164. That element has an entrance opening 166 which mates with conduit 160, and it has an exit opening 168 which mates with conduit 162. Those two openings are interconnected with the element 164. When the end plate 156 is applied over the end of member 154, that interconnecting channel is sealed. In like fashion, the end members 154 and the end plates 156 operate to complete the series connection of the several conduits.

In this application, the members 152, 154 and 156 are formed of a plastic material possessing the property of improved conductivity at lower temperatures. The efficiency with which heat is removed from the core, or, conversely, the efficiency with which cold is stored in the core, can be improved by forming the several conductors within member 152 of metal or other material that is a good conductor of heat. However, the efficiency of the cold storage process is sufficiently high to make it unnecessary to increase cost or to complicate construction of the unit by use of multiple materials.

Returning to the clock, for some applications it is preferred to use a digital clock including an oscillator, counters, comparitors and a ROM in which are stored the times and dates for comparison with the count in the counters. The times and dates referred to define the times and dates when the compressor may be used and is not to be used. That is conveniently accomplished, as in business computer clocks, by using a Julian Calendar clock and defining days by Julian day number and hours and minutes as conventional hours and minutes. There are many micro-processors capable of performing not only the clock functions but all of the control functions. The Intel 8080A family of microcomputer devices is preferred now for several reasons. It is fully documented, there are several sources, it is familiar to many computer technicians and engineers, and it employs separate timer and clock devices. The latter is advantageous because they can be powered separately from a battery during shipping and moving and during utility power outages. The clock functions can be continued without need to supply power to the entire of the micro-processor whereby less battery power is required.

The frost sensor function may be performed by a comparison of the actual operating rate of heat transfer achieved over a stated time interval of evaporator fan operation as measured by the ambient temperature sensor and counted by the clock, against a standard of performance representing heat transfer effect during a similar time period on the ambient sensor when the evaporator is defrosted. An unfavorable comparison of actual performance to standard will in that practice initiate a command to energize the defrost heater.

To form the micro-processor, an 8080A central computing unit, an 8224 System Clock Generator and Drive and an 8228 System Controller are combined with an 8253 Programmable Timer and an 8255 Parallel I/O and an 8259 Priority Interrupt Control. These are connected as described in the Intel Corporation documentation to drive switches either electromechanically as shown in FIG. 2 or equivalent solid state switches in the arrangement depicted in FIG. 3.

Whether it be the Intel 8080A family or another, it is a feature of the invention to put the time-on/time-off data in a memory device that is attachable to the unit. Similarly, the minimum-run-time-per-start-feature will be incorporated in the memory device. The programmable memory device feature, whether in a ROM or in an electromechanical cam set, makes it possible to manufacture the unit complete except for loading of the memory device without regard to its ultimate destination. The data that is loaded into memory is to be defined by the utility which serves the area in which the refrigerator is installed. The memory unit can be loaded by the retail seller or by the utility company or the utility company may elect to furnish pre-loaded memory units. That feature makes the invention very practical, and it makes it possible for the advantages offered by the invention to be made available to users and to energy suppliers without any major change in selling or business procedures.

In FIG. 2, it is the cam unit 64 that is the memory device that contains the compressor off-time program specified by the utility company. Like the read-only memory unit or ROM described above, it may be different for each utility company service area. In this embodiment, like the ROM, it is replaceable. Cams 200 and 201 are seven-day cams, one to interrupt power in the X-Y period on week days and the other 201 to interrupt power in the W-X period on week days. Cam 203 is a daylight savings time cam driven through a gear box 204 and cam 205 is a holiday gear driven through a gear box 206 which includes both a speed reducer and a leap year Geneva gear. Gear 203 controls the flow of energy in series with gears 201 and 200 to relay coils 74 and 72, respectively. Gear 205 supplies energy directly to the relay coils on holidays.

Although we have shown and described certain specific embodiments of our invention, we are fully aware that many modifications thereof are possible. Our invention, therefore, is not to be restricted except insofar as is necessitated by the prior art.

We claim:

1. The method of operating a refrigeration apparatus which employs the series combination of a compressor, a condenser, an evaporator and a cold storage unit and which further employs a refrigerant material which is circulated through that series combination, which method comprises the steps of:
    (a) permitting initiation of the operation of said compressor only at a time which is within a predefined time period and when the quantity of cold stored in said cold storage unit is below a given quantity;
    (b) permitting operation of said compressor to continue only during said predefined time period and while the quantity of cold stored in said cold storage unit is less than a predefined quantity;
    (c) causing extraction of cold from said cold storage unit when the air in said refrigerator has a temperature above a given temperature.

2. The invention defined in claim 1 in which operation of said compressor is continued until the quantity of cold stored in said cold storage unit is greater than a predefined quantity but not less than a predefined time interval unless said predefined time period expires prior to the expiration of said interval.

3. The invention defined in claim 1 in which operation of the compressor is permitted during an initial portion of said predetermined time period notwithstanding that the quantity of cold stored is less than said given quantity.

4. The invention defined in claim 3 in which the step of causing extraction of cold from said cold storage unit is permitted during said initial portion of said time period only when the compressor is operated in said initial portion of said time period.

5. The invention defined in claim 1 which further comprises the step of heating the surface of said cold storage unit when frost exceeds some quantity, but only at a time other than a time when extraction of cold is being caused to occur from said cold storage unit.

6. The invention defined in claim 1 in which the cold storage unit is housed in a container and is exposed to air within said container and in which the step of forcing extraction of cold from said cold storage unit is accomplished by forcing air flow over said unit.

7. The invention defined in claim 6 in which said container is provided with a door communicating, when open, between the interior and exterior of said container and in which the step of forcing ambient air over said unit is discontinued while said door is open.

8. The method of operating a refrigeration unit which comprises the steps of:
    (a) storing cold in a cold storage unit within a refrigerator enclosure by operating a compressor/condenser/evaporator combination periodically when the quantity of stored cold is less than a selected quantity;
    (b) preventing operation of said combination for selected periods of time notwithstanding that the quantity of cold stored is less than said selected amount; and
    (c) storing cold by operating the compressor/condenser/evaporator combination in a period preceding said selected periods notwithstanding that the quantity of cold stored is greater than said selected amount; and
    (d) comprising the further step of measuring the ambient temperature within said enclosure and removing cold from the storage unit when the ambient temperature is above a predefined range of temperatures.

9. The invention defined in claim 8 which comprises the further step of removing cold from the storage unit during said period preceding said selected periods notwithstanding that the ambient temperature in said enclosure is not within said predefined range of temperatures.

10. The invention defined in claim 9 which comprises the further step of heating the surface of said cold storage unit periodically in a degree sufficient to melt frost.

11. The method of operating a refrigeration apparatus in which refrigeration derives from evaporation of liquid to absorb heat from a cold storage unit and the condensing of gasses to absorb cold and in which a refrigerant is made to move through the condensation and absorption cycle by an external power input unit, which method comprises the steps of:
    (a) causing initiation of operation of said compressor within selected time periods in the event that the quantity of cold stored in said cold storage unit becomes less than a predefined amount of cold;
    (b) preventing initiation of operation of said compressor in another selected time period notwithstanding that the quantity of cold stored in said cold storage unit is less than said predefined amount of cold;
    (c) terminating operation of said compressor when the given amount of cold is stored in said cold storage unit or at the beginning of said other selected time period;
    (d) forcing extraction of cold from said cold storage unit when the air in said refrigerator has a temperature above a given temperature.

12. The invention defined in claim 11 in which operation of said external power input unit is permitted during an initial portion of said time periods notwithstanding that the quantity of cold stored is less than said given quantity.

* * * * *